US008984474B2

(12) United States Patent
Toney et al.

(10) Patent No.: US 8,984,474 B2
(45) Date of Patent: Mar. 17, 2015

(54) METHOD AND SYSTEM FOR MODELING BUSINESS OPERATIONS USING A VISION TRANSITION FRAMEWORK

(75) Inventors: Michael S. Toney, Heidelberg (DE); Mark A. Marvin, Hereford, AZ (US)

(73) Assignee: The MITRE Corporation, McLean, VA (US)

( * ) Notice: Subject to any disclaimer, the term of this patent is extended or adjusted under 35 U.S.C. 154(b) by 2304 days.

(21) Appl. No.: 11/028,206

(22) Filed: Jan. 4, 2005

(65) Prior Publication Data
US 2006/0146051 A1 Jul. 6, 2006

(51) Int. Cl.
G06F 9/44 (2006.01)
G06Q 10/02 (2012.01)
(52) U.S. Cl.
CPC G06Q 10/02 (2013.01); G06F 8/35 (2013.01); G06F 8/38 (2013.01)
USPC .......................................... 717/105; 717/107
(58) Field of Classification Search
CPC ...................................................... G06Q 10/02
USPC .................................. 717/101–113, 120–123
See application file for complete search history.

(56) References Cited

U.S. PATENT DOCUMENTS 5,412,756 A * 5/1995 Bauman et al. ................. 706/45

OTHER PUBLICATIONS

The Open Group, "TOGAF—The Open Group Architecture Framework", Dec. 2003, Version 8.1, The Open Group, San Francisco, CA, 349 pages.*
Weide et al., Project Planning and Management, 2003, LEMMA publishers, Netherlands, pp. 11-13, 15-20, 24-37.*
PlanWare, "PlanWare—Free On-line Strategic Planner", 2003, retrieved from http://web.archieve.org/web/20031008050951/http://www.planware.org/strategicplanner.htm, 8 pages.*

* cited by examiner

*Primary Examiner* — Ted T Vo
(74) *Attorney, Agent, or Firm* — Sterne, Kessler, Goldstein & Fox P.L.L.C.

(57) ABSTRACT

Provided is a method and system for logically articulating planned operations within a software based model. The method includes importing data relating to the planned operations and automatically (i) interrelating the imported data and (ii) producing threads and/or activity models. The threads and activity models are representative of the interrelations. The method also includes displaying the threads or activity models via a graphical user interface.

20 Claims, 13 Drawing Sheets

FIG. 1
(CONVENTIONAL)

METHOD AND SYSTEM FOR MODELING BUSINESS OPERATIONS USING A VISION TRANSITION FRAMEWORK

STATEMENT REGARDING FEDERALLY-SPONSORED RESEARCH AND DEVELOPMENT

Part of the work performed during development of this invention utilized U.S. Government funds. The U.S. Government has certain rights in this invention.

BACKGROUND OF THE INVENTION

1. Field of the Invention

The present invention generally relates to architecting business operations for assessing enterprise technology, developing investment strategies, and improving business operations.

2. Background Art

Architecting tools are used in commercial industry to model planned business operations and functions. Architecting large scale business operations to a consistent and adequate level of detail for enabling informative decision making is only realized in the volume and complexity of the resulting products. The volume and complexity of these resulting products reduces the ability of stakeholders and architects to benefit by increasing the timeframe and cost to develop the products. This dilemma reduces the economic and effective usage of the resulting products and presents a paradox in current architecting environments.

Several conventional approaches are available for architecting and modeling business operations. For example, government-off-the-shelf (GOTS) and market leading commercial-off-the-shelf (COTS) tools compete in the architecting market. Few of these architecting tools, however, accomplish more than providing a repository for architecture graphics and general data.

The focus of GOTS and COTS tools, for example, is to facilitate consistent architecture data entry and provide an interface to manually draw architecture products. Tools such as GOTS and COTS, however, are incapable of providing any real analysis capabilities. In most cases, any analysis capability that does exist simply facilitates production of categorized generic reports (i.e., raw data dumps of graphics and repository data).

What is needed, therefore, is a system and method to enable architects to efficiently assess enterprise technology, develop investment strategies, and improve business operations. What is also needed is a method and system to enable architects to work concurrently on the same raw materials to architect, for example, threaded business models.

BRIEF SUMMARY OF THE INVENTION

Consistent with the principles of the present invention as embodied and broadly described herein, the present invention includes a method for logically articulating planned operations within a software based model. The method includes importing data relating to the planned operations and automatically (i) interrelating the imported data and (ii) producing threads and/or activity models. The threads and activity models are representative of the interrelations. The method also includes displaying the threads or activity models via a graphical user interface.

The present invention provides both significant economic and scientific importance to architecture communities of commercial industry and government. For example, a vision transition framework (VTF) application, consistent with the present invention, is one exemplary technique that embodies principles consistent with the present invention.

The VTF application of the present invention brings truly unique capabilities to the field of architecture. These capabilities are non-existent in GOTS and COTS tools. The paradigm shift introduced by VTF, for example, brings opportunity to a field that has progressed very little over a number of years. These capabilities include: volume data entry, massively relational threads, and automatic generation of real-time compliant graphics.

The present invention also introduces a new paradigm, data-centric, to the field of architecture versus the old, graphics-centric paradigm. Data-centric architecture opens the doors to "real" analysis and assessment algorithm development opportunities. Analysis and assessment is problematic and error prone in large architectural models under the graphics-centric paradigm. The graphics-centric paradigm is a tedious and manual process. Under the data-centric paradigm, techniques can be developed to reduce the time and labor of analysis and assessment, producing consistent, repeatable results.

The present invention's VTF application, for example, is a multi-user architecting environment enabling users to work concurrently on the same or different architectures, locally or remotely. Before the VTF application, architecture was developed by a single user and then passed around as a collection of files.

VTF graphics generation allows real-time graphics generation on demand and within user specifications. The inventors of the present application have discovered that use of VTF graphics generation can literally reduce time and labor, associated with graphics development, from months to minutes. VTF graphics generation empowers untrained users to generate specification-compliant architectural diagrams in a button click, using real-time data.

From an economic perspective, the VTF application enables architects to achieve fruition of their efforts in a significantly reduced time frame. As noted above, the VTF application also enables architects to achieve large and complex efforts with much smaller skilled work forces. More specifically, VTF provides a data oriented development with generation of commercial graphical results.

The principle concept of VTF, and its associated databases, is that business operations can be threaded from top to bottom and further reinforced by artifacts that describe various areas of a given thread. Understanding the composition of these threads and the application of automation facilitates the development process (e.g., reduction of development time and associated costs). Understanding this composition also enables economic and effective usage of the resulting architecture products (i.e., intention of the architectural products).

The exemplary VTF application targets the fundamental issue of architecting within the constructs of existing frameworks. For example, within a framework, a thread begins with a mission (e.g., business area, function, area of responsibility, etc.). The mission can be decomposed to abstract visions of how the mission can be successfully achieved and further decomposed to specific strategies for achieving those visions. Finally, The specific strategies can be decomposed to specific sets of activities. This framework description represents the core of the VTF application and its database.

Further embodiments, features, and advantages of the present invention, as well as structure and operation of the various embodiments of the present invention, are described in detail below with reference to the accompanying drawings.

BRIEF DESCRIPTION OF THE DRAWINGS/FIGURES

The accompanying drawings, which are incorporated in and constitute part of the specification illustrate embodiments of the invention and, together with the general description given above and the detailed description of the embodiments given below, serve to explain the principles of the present invention. In the drawings.

DETAILED DESCRIPTION OF THE INVENTION

The following detailed description of the present invention refers to the accompanying drawings that illustrate exemplary embodiments consistent with this invention. Other embodiments are possible, and modifications may be made to the embodiments within the spirit and scope of the invention. Therefore, the detailed description is not meant to limit the invention. Rather, the scope of the invention is defined by the appended claims.

The present invention, as described below, may be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

Figure 1:
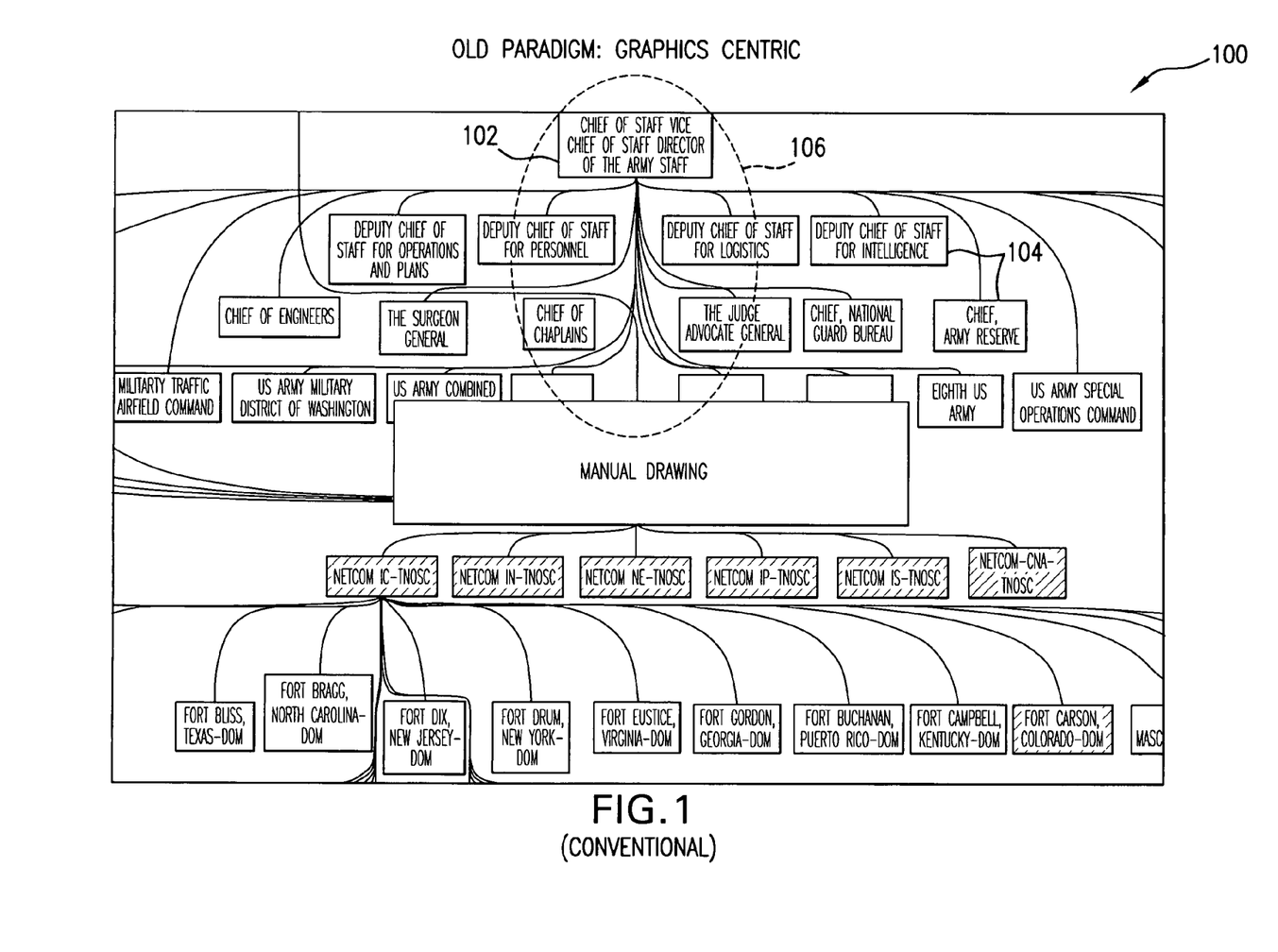
FIG. 1 is a high level block diagram illustration of a conventional modeling and architecture technique.

FIG. 1 is a high level block diagram illustration of a conventional architecturing and modeling technique 100. In FIG. 1, the conventional technique 100 can be used to interrelate a high level business component, such as a mission 102, to subordinate components 104, such as visions or strategies. The interrelation of the mission 102 in divisions or strategies 104 forms a thread 106. All of the other boxes within FIG. 1, represent other related business components and threads.

In the conventional technique 100, all graphics, such as the boxes illustrated in FIG. 1 representative of the components 102 and 104, must be hand drawn. In order to provide more complex architectures, manually drawing and interrelating the business components and threads can be time consuming and require thousands of man hours to develop. By using the approach of the present invention, however, this labor intensive and data centric approach can be significantly simplified.

Figure 2:
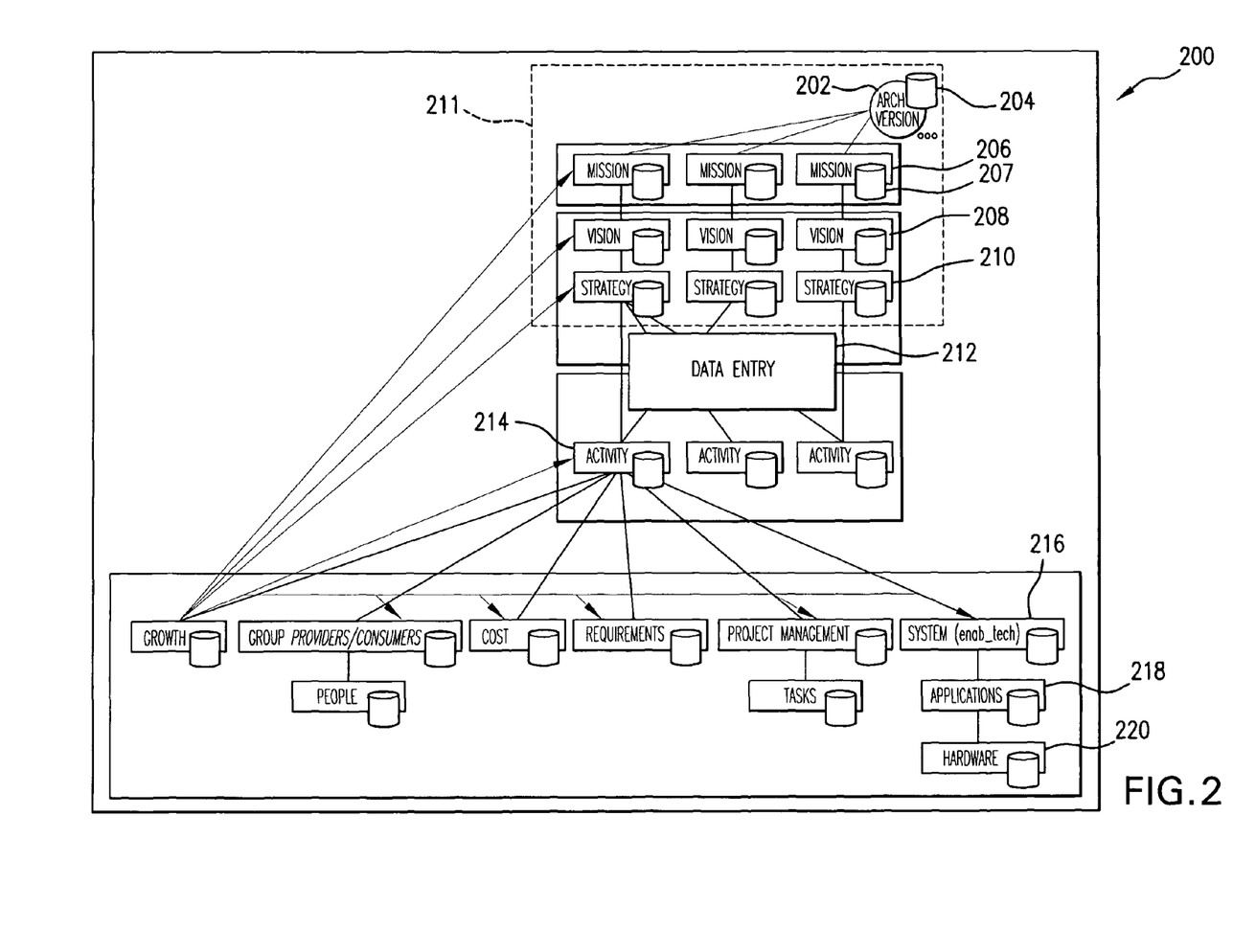
FIG. 2 is a high level block diagram view of an architecting system constructed in accordance with an embodiment of the present invention.

FIG. 2 is an illustration of a high level block diagram view of an architecting system constructed in accordance with an embodiment of the present invention. More particularly, FIG. 2 provides an exemplary high level concept of a threaded business model 200. In FIG. 2, the threaded business model 200 includes an exemplary defined architecture 202, along with a corresponding architecture database 204. As used herein, an architecture is defined as the structure of components, their relationships, and the principles and guidelines governing their design and evolution over time. An architecture can provide a valuable input to assessing enterprise technology and making investment strategies in business improvements.

The Department of Defense (DoD) architecture framework (AF), for example, provides common guidelines for describing architectures. The DoD AF also provides guidelines for examining processes and system alternatives in context with mission operations and the information required. The VTF application, and its database, is one of the tools that can be used to build an architecture within this exemplary DoD AF.

In FIG. 2, the exemplary architecture 202 can be structured in accordance with VTF principles. For example, the architecture 202 can include subordinate components such as mission components 206, vision components 208, and strategy components 210. In the illustration of FIG. 2, each of the mission components 206 includes related database artifacts (or meta-data) 207, which define their associated mission.

Each of the mission components 206 corresponds to one of the vision components 208. The vision components 208 are subordinate to the mission components 206. Further, the strategy components 210 correspond to, and are subordinate to, the vision components 208. The architecture 202, the mission components 206, the vision components 208, and the strategy components 210 combine to form a thread 211.

In the present invention, a GUI based data entry mechanism 212 enables a user to automatically, or manually, input data relating to the mission component 206, the vision component 208, and the strategy component 210. Additionally, the data entry mechanism 212 will also permit the user to input and automatically interrelate additional components, such as exemplary activity related components 214. In FIG. 2, the activity components 214 are subordinate to and further define a corresponding strategy component 210.

The present invention also facilitates decomposition of each of the activity components 214 into subordinate components, such as specific systems 216, applications 218, and exemplary hardware 220. That is, within the architecture 202, the systems 216 are used to facilitate a corresponding activity 214 and the applications 218 represent specific functions that can be provided by the systems 216. Furthermore, the exemplary hardware 220 can be used to implement the applications 218 and the systems 216.

Figure 3:
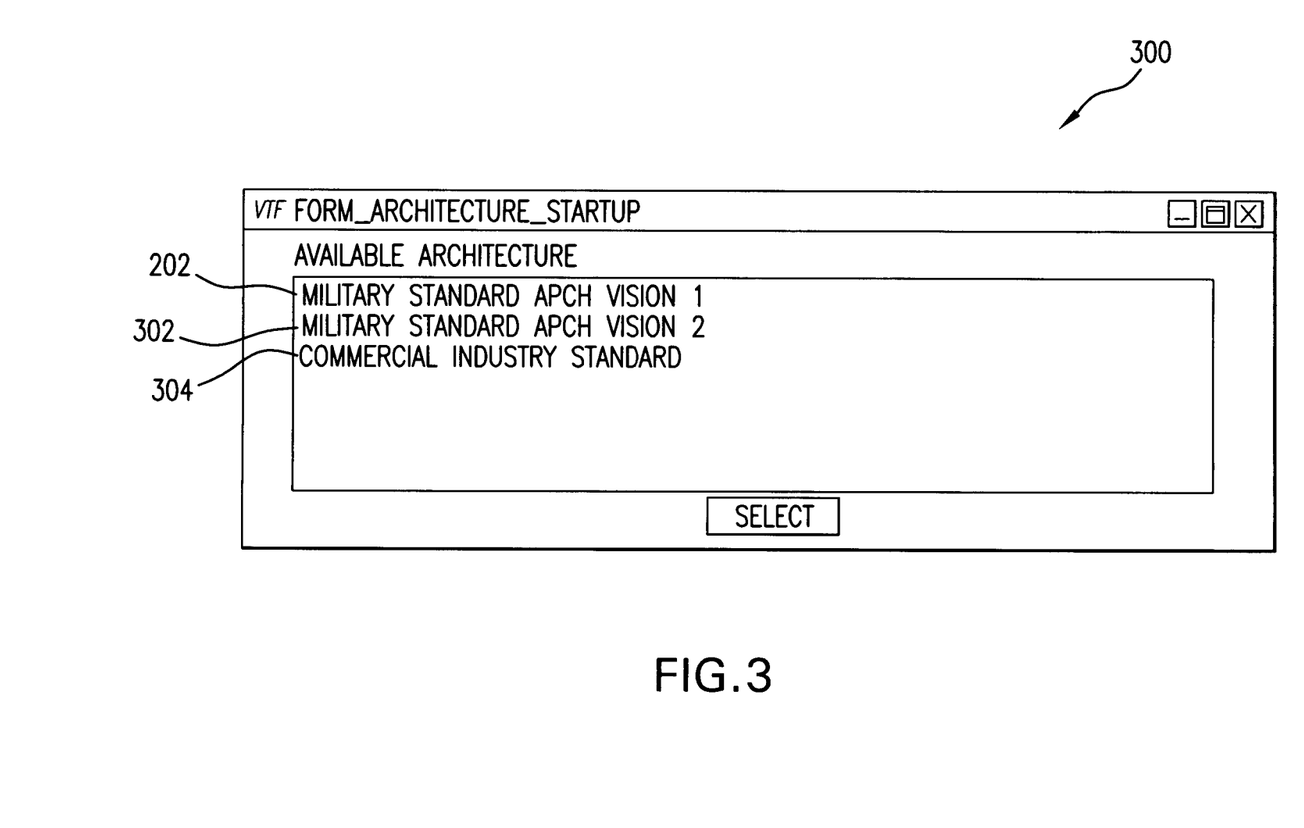
FIG. 3 is an exemplary graphical user interface (GUI) arranged in accordance with an embodiment of the present invention.

FIG. 3 is an illustration (i.e. screen shot) of an exemplary GUI 300 that permits a user to select between a plurality of different architectures in order to initiate an architecturing/modeling session. For example, once the user decides to construct the exemplary model 200 of FIG. 2, a computer system having a computer monitor will display the exemplary GUI 300 on the computer monitor.

Displayed within the GUI screen shot 300 is the architecture 202 selected in FIG. 2. In FIG. 3, for example, the architecture 202 can be representative of a military standard architecture version 1. Alternatively, a user, accessing the system using the exemplary GUI 300, can also select between other versions of architecture, such as an architecture 302 (e.g., military standard version 2), and an architecture 304 (e.g., commercial industry standard architecture).

It is understood by those of skill in the art that each of the architectures 202, 302, and 304 would differ from one another in certain aspects. They differ in the way that their internal components, their relationships, and the principles and guidelines governing the interrelation of those components and relationships, evolves over time. That is, each of the architectures 202, 302, and 304 would include their own unique threads, different from the thread 211, shown in FIG. 2. In short, the exemplary GUI 300 represents an initial architecture start-up form that can be automatically presented to a user once a computer system hosting the present invention is activated.

Once the exemplary GUI 300 has been utilized by a user to select a desirable architecture from among the architectures 202, 302 and 304, the user can then be presented with additional GUIs that correspond to specific components associated with a selected one of the architectures 202, 302 and 304.

Figure 4:
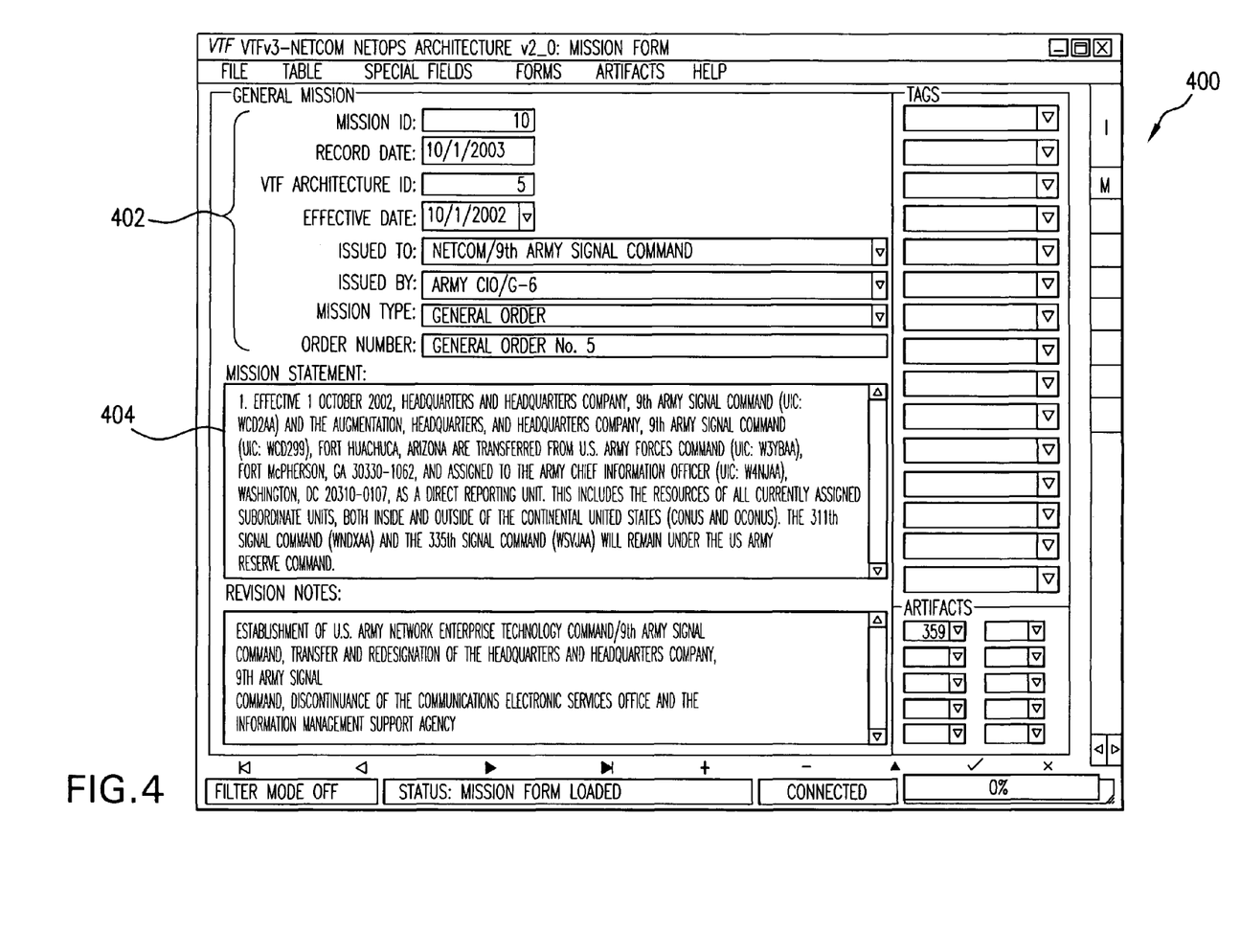
FIG. 4 is an exemplary illustration of a mission based GUI provided in accordance with an embodiment of the present invention.
Figure 5:
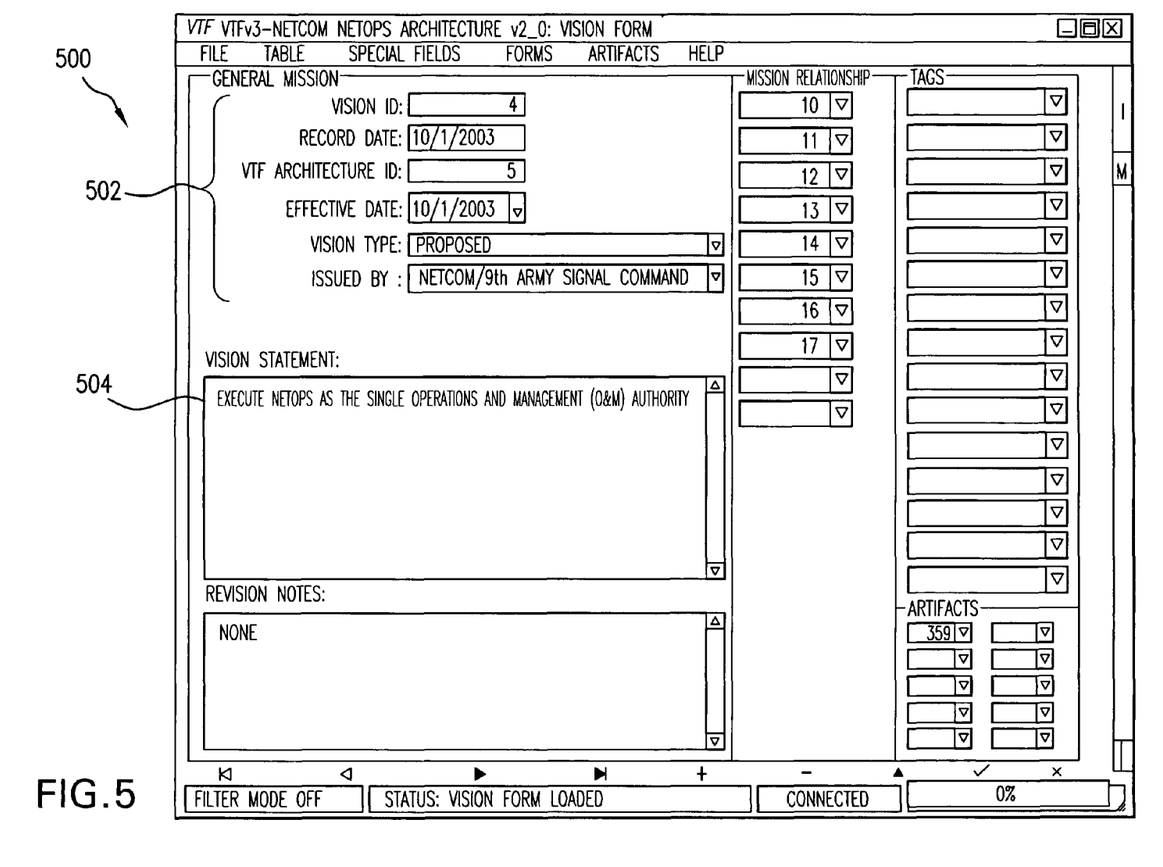
FIG. 5 is an exemplary illustration of a vission based GUI provided in accordance with an embodiment of the present invention.
Figure 6:
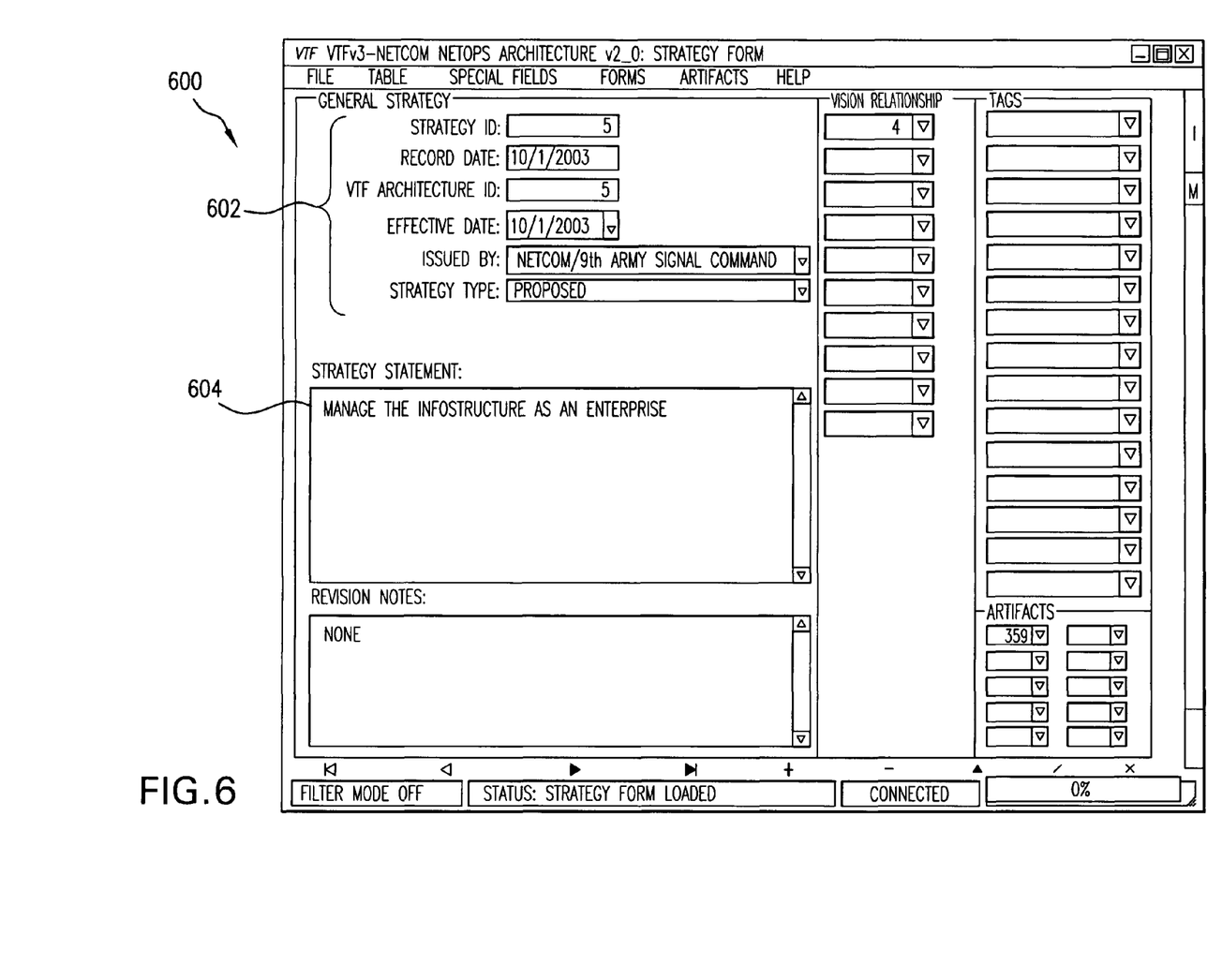
FIG. 6 is an exemplary illustration of a strategy based GUI provided in accordance with an embodiment of the present invention.

Further, the architecture 202, producing the thread 211 shown in FIG. 2 selected via the exemplary GUI 300, can include additional exemplary GUIs 400, 500, and 600 illustrated in FIGS. 4, 5, and 6, respectively. In other words, by selecting the architecture 202 (i.e. military standard architecture version 1) using the exemplary GUI 300 of FIG. 3, a final product in the form of the business model 200 will be produced.

FIG. 4 is an illustration of an exemplary VTF based GUI 400 arranged in accordance with an embodiment of the present invention. In FIG. 4, the exemplary GUI 400 is a mission form, corresponding with one of the mission components 206, shown in FIG. 2. In FIG. 4, the exemplary GUI 400 permits a user to complete a number of exemplary data fields 402 after an initial data entry mode. Described in greater detail below, the user can populate the data fields 402 in order to view a mission statement 404. The mission statement 404 can result, for example, by a user entering raw data (text) defining a specific mission.

In an embodiment of the present invention, once the mission form 400 has been reviewed, edited, and entered by the user, a vision form (see e.g., FIG. 5) will automatically be produced. The production of this vision form is based on an autonomous decomposition of the mission 404, inherent within the exemplary VTF application of the instant invention. For example, as illustrated in FIG. 2, each of the mission components 206 can be decomposed into one or more vision components 208.

FIG. 5 is an illustration of an exemplary vision based GUI 500 provided in accordance with the present invention. In FIG. 5, by way of example, the user is presented with the exemplary GUI 500, corresponding to one of the vision components 208 of FIG. 2. In FIG. 5, the exemplary GUI 500 includes input data fields 502 permitting the user to input specific data identifiers in order to view a corresponding vision statement 504.

The vision statement 504 represents a decomposition of one of the mission components 206. In other words, the vision based GUI 500 is used to manage one or more vision statements that describe the intent of an organization to accomplish a specific mission, or a group of missions. Each of the mission components 206 can represent one such specific mission. In FIG. 5, the exemplary GUI 500 also provides the ability to link a vision product to a plurality of mission statements.

FIG. 6 is an illustration of an exemplary GUI 600 used to manage strategy statements. Strategy statements are prepared by an organization and can be used to describe internal strategies used to accomplish a specific vision, or group of visions. One such vision is embodied within the vision statement 504 of FIG. 5.

In FIG. 6, the exemplary GUI 600 includes a plurality of data entry fields 602. The data entry fields 602 enable a user to input specific identifiers related to a specific strategy, such as a strategy statement 604. In the present invention, internal guidelines associated with the selected architecture version 202, provide specific definitions and guidelines in constructing missions, visions, and strategies.

For example, the selected architecture 202 stipulates that strategies are defined by one or more organizations or commands and are linked to one or more vision products, such as the vision statement 504 displayed within the GUI 500. Also, within the architecture 202, strategies are subordinate to visions and visions, in turn, are subordinate to missions. Thus, within the illustration of FIG. 6, the data fields 602 can be used by the user to view the particular strategy statement 604 that corresponds to one of the selected strategies 210, shown in FIG. 2.

The strategy 604 is subordinate to the vision 504, which is subordinate to the mission 404 as illustrated within the hierarchy of the thread 211, shown in FIG. 2. FIGS. 2-6 illustrate options presented to a user after data has been loaded into a database and configured for use within, for example, the VTF application. FIGS. 7-10 address the issue of actually entering data into a database for use within the context of the present invention.

Within the context of the present invention, graphical, textual, and tabular items that are developed in the course of gathering architecture data, are referred to as architecture products. Architecture products are composed of related architecture components or composites and model the relationships, among those composites, to describe characteristics pertinent to the architecture's purpose.

The exemplary VTF application of the present invention, supports multiple architectures. Each architecture includes its own collection of threaded products and supporting artifacts. The forms, or GUIs, used to display and define each product have several common fields, such as an ID field and a field for recording the date the product was first added to the associated VTF application database. Artifacts, for example, can include data recorded in a variety of formats.

For example, an organizational chart, originally prepared in Microsoft PowerPoint, might contain a single paragraph that describes an organization's overall mission. By way of example, this one paragraph chart is considered an artifact. Similarly, a two-page position paper, originally prepared using the WordPerfect word processing program is also considered an artifact. And a hard copy report, originally hand typed using a type-writer, can also be considered an artifact.

As noted above, a preliminary aspect of the VTF application, implemented within the present invention, was to confront a fundamental issue of architecting. This issue was confronted by demonstrating how architecture products could rapidly be threaded and how threading support is achievable with automation.

The present invention also reduces the burden of labor for architecting by increasing the speed of architecture data entry and product development. The goal of data entry is facilitated by click and drag graphics and drop down menus, with linkable data fields that collectively enable rapid thread development.

Figure 7:
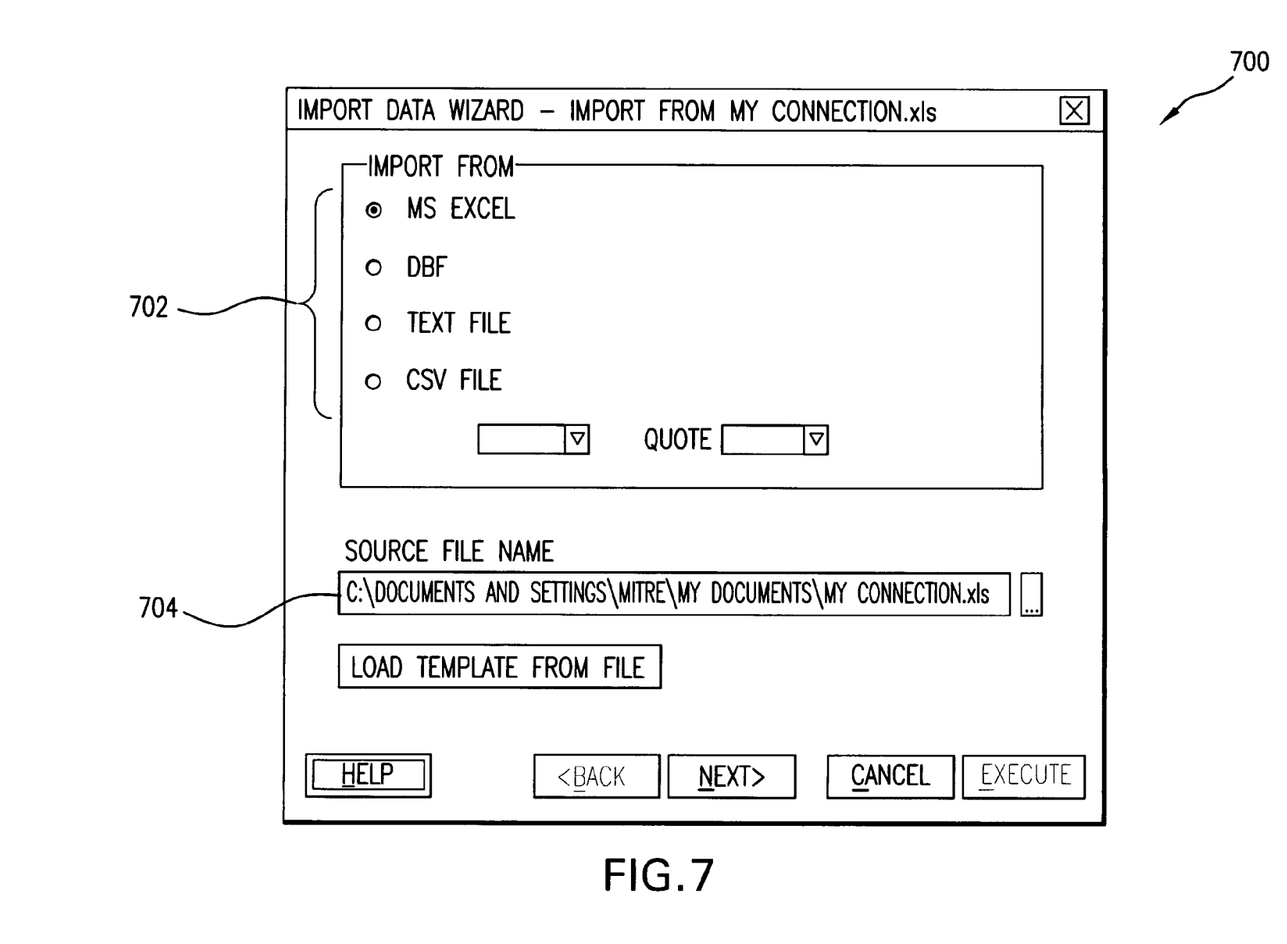
FIG. 7 is an exemplary illustration of a data entry GUI in accordance with an embodiment of the present invention.

FIG. 7 is an illustration of an exemplary GUI 700 provided in accordance with an embodiment of the present invention. In FIG. 7, the GUI 700 enables a user to import data from a variety of sources. For example, a selection table 702 enables a user to first identify the original format of data to be loaded. The data requiring loading can might originally be formatted in Microsoft Excel, a database format. As another example, the data could be merely an ASCII text file.

Thus, a user employing the present invention might first be provided with a copy of a computer disk containing a Microsoft Excel file. Once this file is loaded on to a host computer, the VTF application is alerted that the file is in fact in Microsoft Excel format. Once this process is confirmed, a source file name of the document is determined and displayed in an exemplary source file name window 704.

In the present invention, once data items have been entered, they are automatically interrelated and threaded with all other documents that have previously been loaded, regardless of the initial format of these other documents. Next, architecture threads representative of the interrelations, such as the threads 211 in FIG. 2, are automatically produced. The data that has been currently selected and displayed via the GUI 700 can then be exported and/or saved in a number of different formats.

Figure 8:
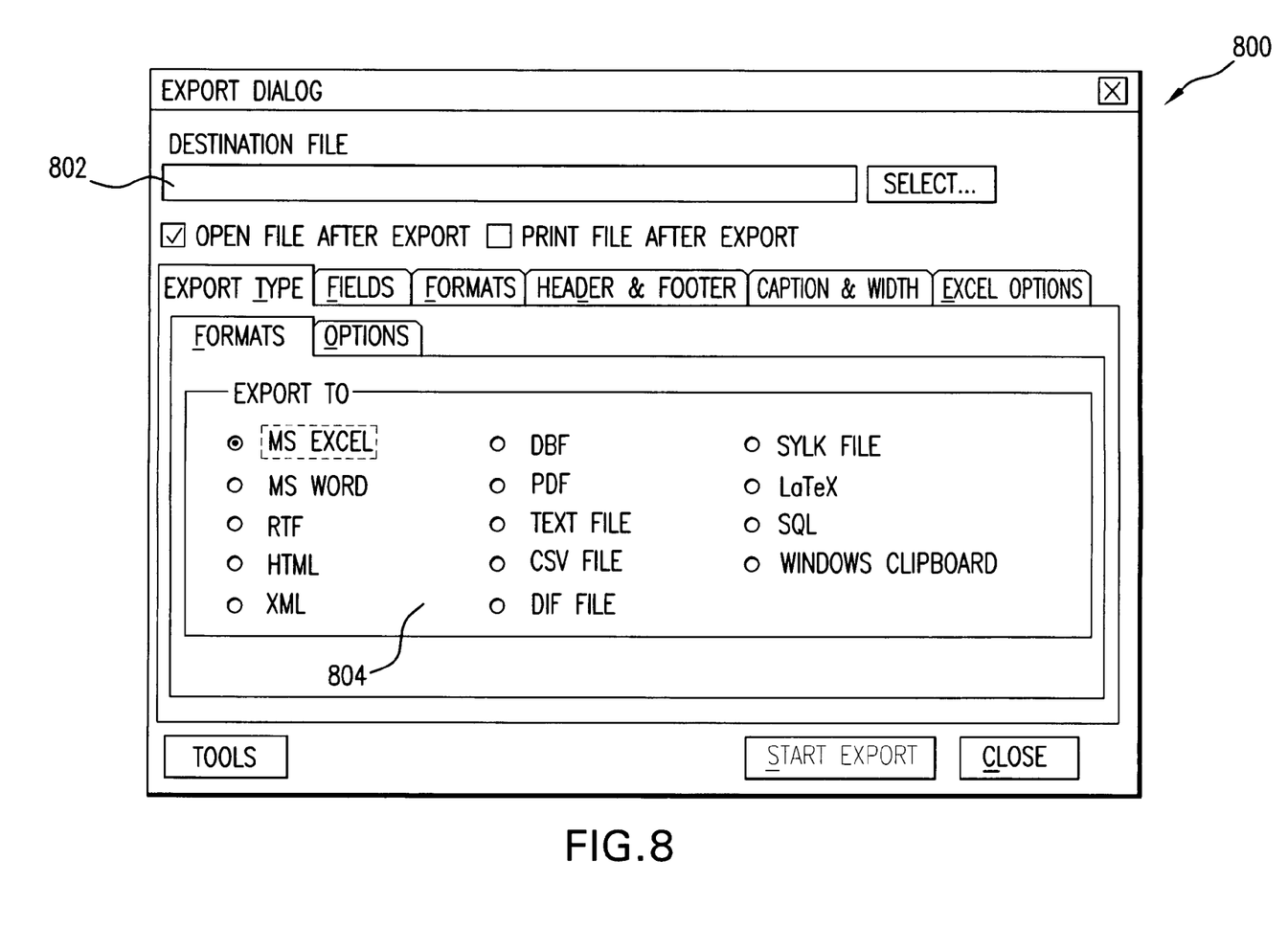
FIG. 8 is an exemplary illustration of a data export GUI provided in accordance with an embodiment of the present invention.

FIG. 8 is an illustration of an exemplary data export GUI 800 provided in accordance with the present invention. In FIG. 8, the GUI 800 is presented to the user to accommodate storage of the file displayed in the window 704 of the GUI 700, in different data formats. For example, an artifact that was originally imported as an MS Excel file and displayed having its file name in the window 704 can be exported/saved as an MS Excel file, based on selection of an appropriate export file selection field 804. Similarly, the MS Excel file could be converted and stored as a PDF file, as a HTML file, or any suitable file consistent with teachings of the present invention.

Figure 9:
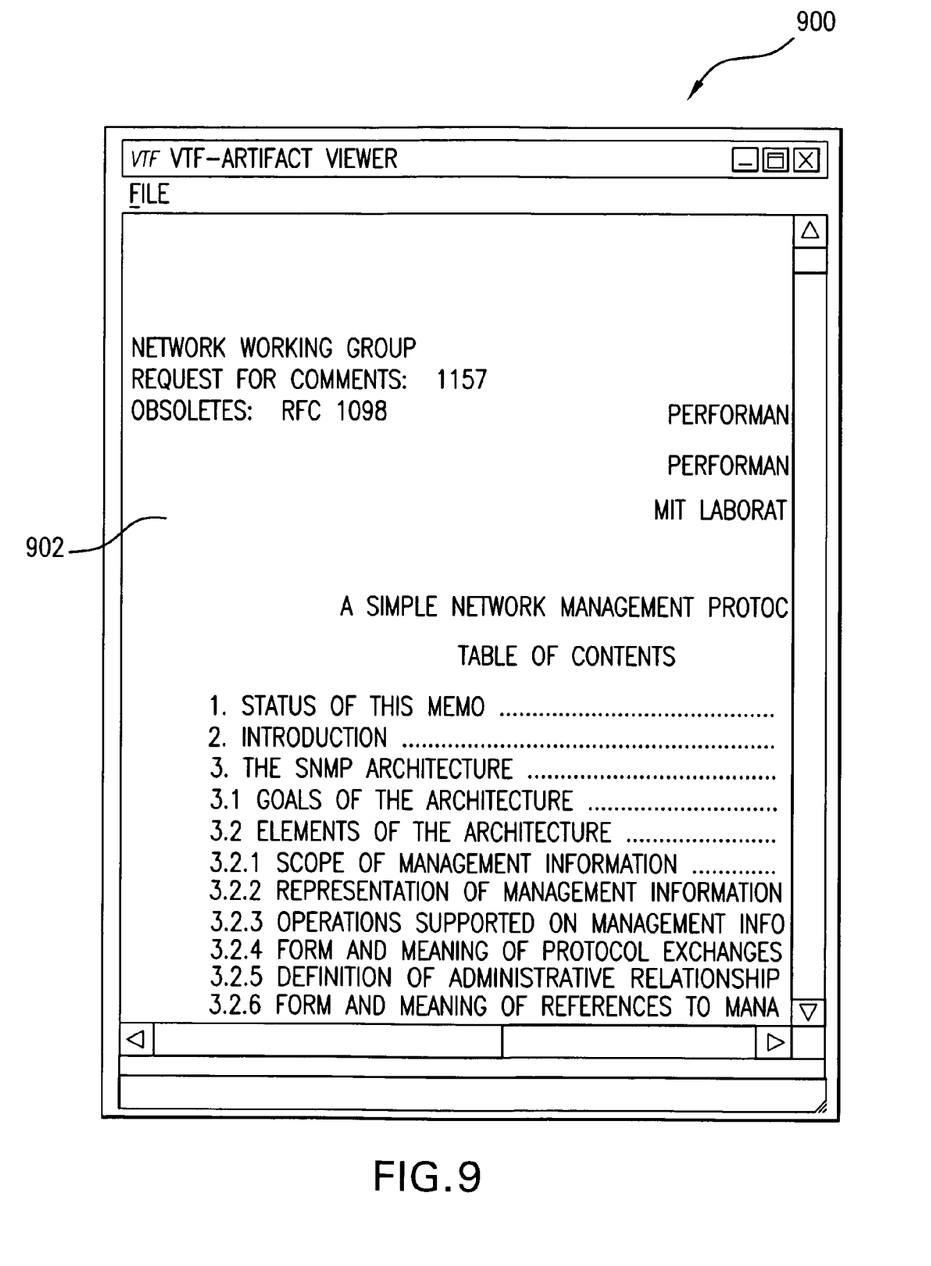
FIG. 9 is an exemplary GUI for viewing artifacts.

FIG. 9 is an illustration of an exemplary GUI 900 permitting a user to view recently stored artifacts. For example, the GUI 900 permits the user to view a text document 902, after the document has been stored in a corresponding VTF database. As noted above, architecture artifacts can be loaded as electronic files or can be scanned in as electronic copies.

In accordance with a particular architecture version and VTF rules in general, electronic documents that are loaded automatically can in turn be automatically linked and threaded. On the other hand, documents that are scanned in or entered by other document entry means are instructed by the user as to which links and rules apply.

Figure 10:
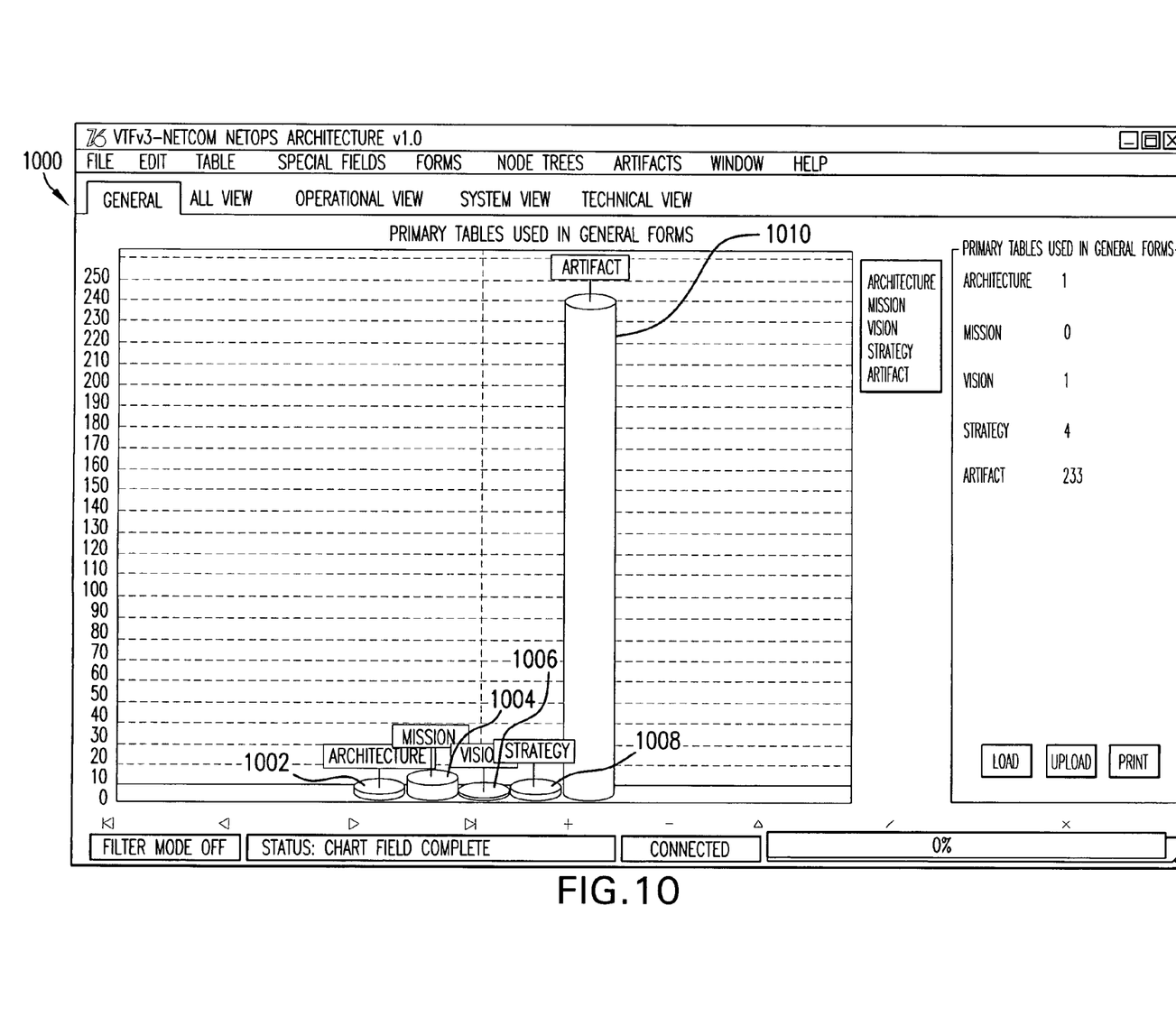
FIG. 10 is an exemplary GUI showing database storage features of an embodiment of the present invention.

FIG. 10 is an illustration of an exemplary GUI 1000 for conveying to the user a specific number of architecture products that have been stored. For example, the GUI 1000 displays a specific numeric count of architecture products 1002, mission related products 1004, vision related products 1006, and strategy related products 1008. Also, a total number of artifacts 1010 that have been stored, is also conveyed to the user via the GUI 1000.

Figure 11:
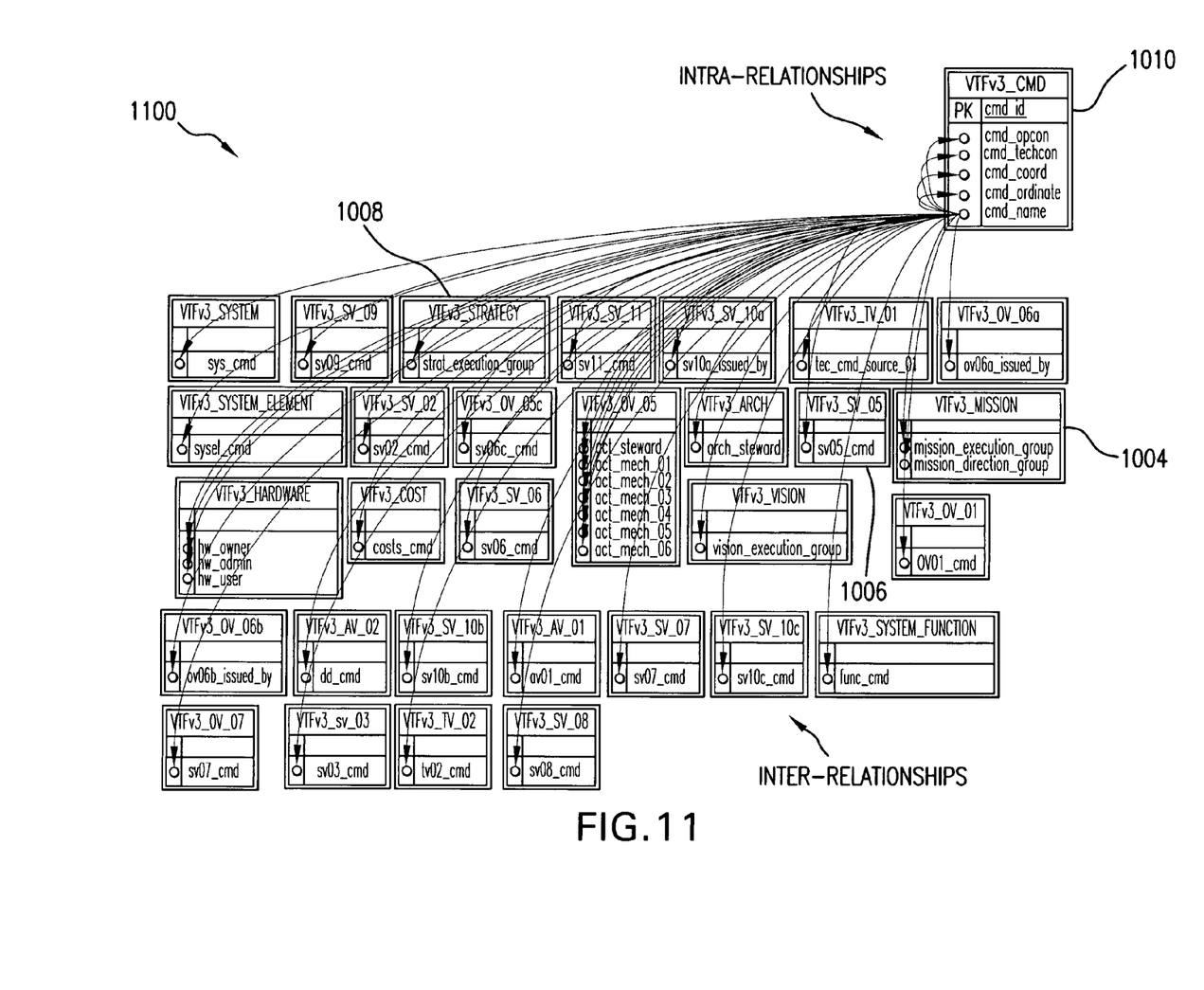
FIG. 11 is an exemplary block diagram illustration of relationships between items stored within the database of FIG. 10.

FIG. 11 is a block diagram illustration 1100 of interrelationships between the exemplary architecture products shown in FIG. 10. For example, in FIG. 11, the architecture products 1010 can be automatically linked to the mission products 1004, division products 1006, and the strategy products 1008 and threaded as shown. The threads, or interrelationships between the products 1004-1010 are representative of business operations and are at an adequate level of detail to enable informative decision-making. The automatic formation of these threads and the GUIs in FIGS. 3-10, significantly shortens the timeframes required normally associated with large scale business architecting.

Figure 12:
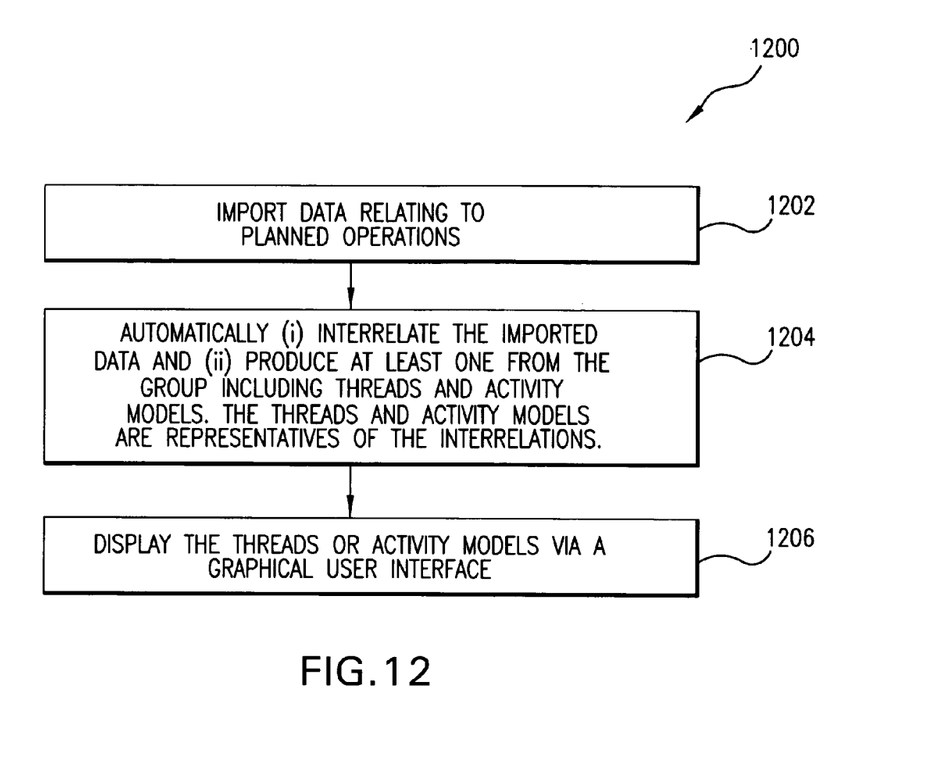
FIG. 12 is a flowchart of an exemplary method of practicing an embodiment of the present invention.

FIG. 12 is a flowchart of an exemplary method 1200 of practicing an embodiment of the present invention. In FIG. 12, data relating to planned operations is imported, as indicated in step 1202. In step 1204, the imported data are automatically interrelated and at least one from the group including threads and activity models, are produced. The threads and activity models are representative of the interrelations. The method 1200 also includes displaying the threads or activity models via a graphical user interface, as indicated in step 1206.

The following description of a general purpose computer system is provided for completeness. The present invention can be implemented in hardware, or as a combination of software and hardware. Consequently, the invention may be implemented in the environment of a computer system or other processing system.

Figure 13:
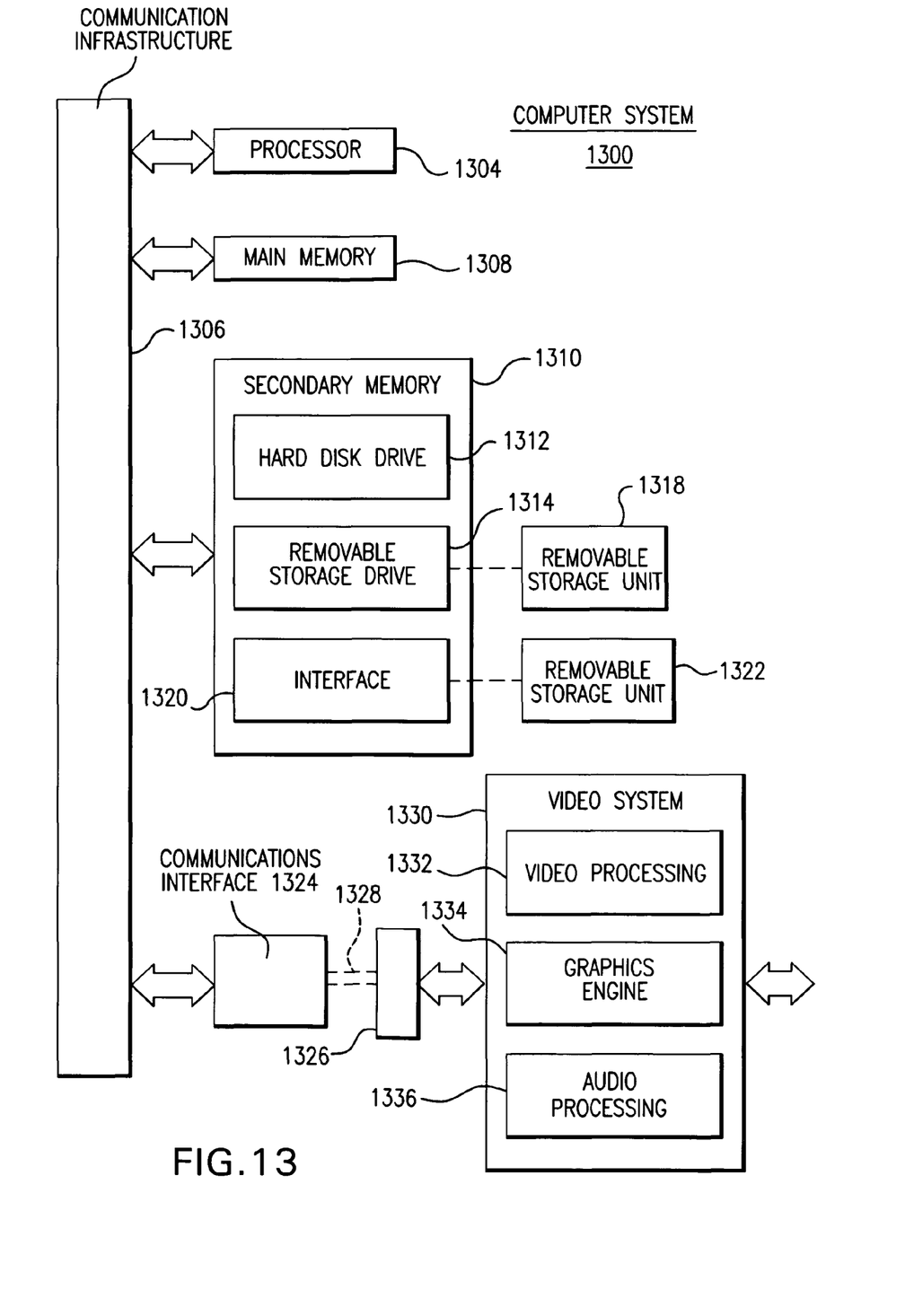
FIG. 13 is a block diagram illustration of an exemplary computer system on which the present invention can be practiced.

An example of such a computer system 1300 is shown in FIG. 13. In the present invention, all of the elements depicted in FIGS. 2-12, for example, can execute on one or more distinct computer systems 1300, to implement the various methods of the present invention. The computer system 1300 includes one or more processors, such as a processor 1304. The processor 1304 can be a special purpose or a general purpose digital signal processor.

The processor 1304 is connected to a communication infrastructure 1306 (for example, a bus or network). Various software implementations are described in terms of this exemplary computer system. After reading this description, it will become apparent to a person skilled in the relevant art how to implement the invention using other computer systems and/or computer architectures.

The computer system 1300 also includes a main memory 1308, preferably random access memory (RAM), and may also include a secondary memory 1310. The secondary memory 1310 may include, for example, a hard disk drive 1312 and/or a removable storage drive 1314, representing a floppy disk drive, a magnetic tape drive, an optical disk drive, etc.

The removable storage drive 1314 reads from and/or writes to a removable storage unit 1318 in a well known manner. The removable storage unit 1318, represents a floppy disk, magnetic tape, optical disk, etc. which is read by and written to by the removable storage drive 1314. As will be appreciated, the removable storage unit 1318 includes a computer usable storage medium having stored therein computer software and/or data.

In alternative implementations, the secondary memory 1310 may include other similar means for allowing computer programs or other instructions to be loaded into the computer system 1300. Such means may include, for example, a removable storage unit 1322 and an interface 1320.

Examples of such means may include a program cartridge and cartridge interface (such as that found in video game devices), a removable memory chip (such as an EPROM, or PROM) and associated socket, and other removable storage units 1322 and interfaces 1320 which allow software and data to be transferred from the removable storage unit 1322 to the computer system 1300.

The computer system 1300 may also include a communications interface 1324. The communications interface 1324 allows software and data to be transferred between the computer system 1300 and external devices. Examples of the communications interface 1324 may include a modem, a network interface (such as an Ethernet card), a communications port, a PCMCIA slot and card, etc.

Software and data transferred via the communications interface 1324 are in the form of signals 1328 which may be electronic, electromagnetic, optical or other signals capable of being received by the communications interface 1324. These signals 1328 are provided to the communications interface 1324 via a communications path 1326. The communications path 1326 carries the signals 1328 and may be implemented using wire or cable, fiber optics, a phone line, a cellular phone link, an RF link and other communications channels.

The communications path 1326 can couple the communications interface 1324 to an exemplary video system 1330. By way of example, the video system 1330 can include a video processing module 1332, a graphics engine 1334, and an audio processing module 1336.

In the present application, the terms "computer readable medium" and "computer usable medium" are used to generally refer to media such as the removable storage drive 1314, a hard disk installed in the hard disk drive 1312, and the signals 1328. These computer program products are means for providing software to the computer system 1300.

Computer programs (also called computer control logic) are stored in the main memory 1308 and/or the secondary memory 1310. Computer programs may also be received via the communications interface 1324. Such computer programs, when executed, enable the computer system 1300 to implement the present invention as discussed herein.

In particular, the computer programs, when executed, enable the processor 1304 to implement the processes of the present invention. Accordingly, such computer programs represent controllers of the computer system 1300. By way of example, in the embodiments of the invention, the processes/methods performed by signal processing blocks of encoders and/or decoders can be performed by computer control logic.

Where the invention is implemented using software, the software may be stored in a computer program product and loaded into the computer system 1300 using the removable storage drive 1314, the hard drive 1312 or the communications interface 1324.

CONCLUSION

The present invention provides a unique computer based technique for threading business operations from top to bottom and further reinforcing artifacts that describe various business related areas within a given thread. The present invention is based on the idea of understanding the composition of a given thread and uses the application of automation to facilitate business model architecting.

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art (including the contents of any references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What we claim is:

1. A method for logically architecting business operations, the method comprising:
    importing data relating to an architecture within the business operations, wherein the data is imported into a computer system;
    automatically, using the computer system, (i) interrelating the data and (ii) producing a plurality of threads representative of the interrelations, a thread from the plurality of threads including a mission component, at least one vision component, and at least one strategy component, wherein each said strategy component is subordinate to one or more of the at least one vision component, and each said vision component is subordinate to the at least one mission component, wherein the interrelations are created in a memory;
    forming, using the computer system, relations from a data artifact to at least one of said mission component, said at least one vision component, or said at least one strategy component, wherein the data includes the data artifact, and wherein said relations are formed in the memory; and
    reporting the thread from the memory using a graphical representation.

2. The method of claim 1, further comprising: interrelating an activity component to one or more of said at least one strategy component wherein the activity component is related to none, one or more of said data artifacts.

3. The method of claim 2, wherein the reporting includes displaying the thread via a graphical user interface (GUI).

4. The method of claim 1, wherein the importing includes selecting from one or more importation formats each corresponding to an initial format of the data.

5. The method of claim 4, wherein the importation formats are displayed within a template via the GUI.

6. The method of claim 1, wherein the data further includes meta-data.

7. The method of claim 1, further comprising storing the data and the plurality of threads in an internal relational database.

8. The method of claim 7, wherein the data is imported from an external database.

9. The method of claim 7, further comprising facilitating near real-time or realtime user analyses of the plurality of threads via the GUI.

10. The method of claim 1, further comprising:
    automatically producing a second thread representative of the interrelations, wherein the second thread and the first thread are interrelated through one or more of the mission component, the vision component, the strategy component, or the data artifact.

11. A system for logically architecting business operations, comprising:

a memory and at least one processor coupled to the memory, the at least one processor configured to:

import data relating to an architecture within the business operations into the system;

interrelate the imported data;

produce a plurality of threads, in the system, representative of the interrelations, a thread from the plurality of threads including a mission component, at least one vision component, and at least one strategy component, wherein each said strategy component is subordinate to one or more of the at least one vision component, and each said vision component is subordinate to at least one mission component, wherein the interrelations are created in the memory; and relate from a data artifact to at least one of said mission component, said vision component, or said strategy component, wherein said imported data includes the data artifact, and wherein said relations are formed in the memory.

12. The system of claim 11, wherein the at least one processor is further configured to interrelate an activity component to said strategy component wherein the activity component is related to none, one or more of said data artifacts.

13. The system of claim 12, further comprising a display configured to display the thread via a graphical user interface (GUI).

14. The system of claim 11, wherein the at least one processor is further configured to select from one or more importation formats each corresponding to an initial format of the data.

15. The system of claim 14, wherein the importation formats are displayed within a template via the GUI.

16. The system of claim 12, wherein the data includes meta-data.

17. The system of claim 16, wherein the at least one processor is further configured to store the data and the thread in an internal relational database.

18. The system of claim 17, wherein the data is imported from an external database.

19. The system of claim 17, wherein the at least one processor is further configured to facilitate near real-time user analyses of the threads via the GUI.

20. A tangible computer readable storage medium storing one or more instructions, the one or more instructions when executed by one or more processors, causing the one or more processors to perform a method comprising:

importing data relating to the architecture;

automatically (i) interrelating the data and (ii) producing a plurality of threads representative of the interrelations, a thread from the plurality of threads including a mission component, at least one vision component, and at least one strategy component, wherein each said strategy component is subordinate to one or more of the at least one vision component, and each said vision component is subordinate to at least one mission component, wherein the interrelations are created in a memory; and reporting the thread using a graphical representation.

* * * * *